(12) United States Patent
Bergami et al.

(10) Patent No.: US 11,401,060 B2
(45) Date of Patent: Aug. 2, 2022

(54) METHOD AND APPARATUS FOR APPLYING A SEALING MEMBER TO A CAPSULE FOR PREPARING A BEVERAGE

(71) Applicant: SACMI COOPERATIVA MECCANICI IMOLA SOCIETA' COOPERATIVA, Imola (IT)

(72) Inventors: Stefano Bergami, Bologna (IT); Danilo Albonetti, Bologna (IT)

(73) Assignee: SACMI COOPERATIVA MECCANICI IMOLA SOCIETA COOPERATIVA, Imola (IT)

( * ) Notice: Subject to any disclaimer, the term of this patent is extended or adjusted under 35 U.S.C. 154(b) by 0 days.

(21) Appl. No.: 16/616,124

(22) PCT Filed: May 25, 2018

(86) PCT No.: PCT/IB2018/053735
§ 371 (c)(1),
(2) Date: Nov. 22, 2019

(87) PCT Pub. No.: WO2018/215982
PCT Pub. Date: Nov. 29, 2018

(65) Prior Publication Data
US 2020/0172273 A1 Jun. 4, 2020

(30) Foreign Application Priority Data

May 26, 2017 (IT) .................... 102017000057712

(51) Int. Cl.
*B65B 7/28* (2006.01)
*B65B 29/02* (2006.01)
(Continued)

(52) U.S. Cl.
CPC ............ *B65B 7/2871* (2013.01); *B29C 43/08* (2013.01); *B29C 43/18* (2013.01); *B29C 43/34* (2013.01);
(Continued)

(58) Field of Classification Search
CPC ... B65B 7/2871; B65B 29/022; B65B 7/2878; B65B 51/02; B65B 51/10; B29C 43/08;
(Continued)

(56) References Cited

U.S. PATENT DOCUMENTS 4,464,322 A * 8/1984 Butler ..................... B29C 70/68
264/138
4,640,733 A * 2/1987 Bogren ............. B29C 66/72321
156/380.2
(Continued)

FOREIGN PATENT DOCUMENTS

CN 1599666 3/2005
CN 1665468 9/2005
(Continued)

OTHER PUBLICATIONS

Patent Cooperation Treaty (PCT), International Search Report and Written Opinion issued in PCT International Application No. PCT/IB2018/053735 (International Filing Date May 25, 2018), dated Nov. 22, 2018 (14 pgs).
(Continued)

*Primary Examiner* — Dariush Seif
(74) *Attorney, Agent, or Firm* — Wentsler LLC

(57) ABSTRACT

A method for applying a sealing member to a capsule intended for the preparation of a beverage in a device for making beverages, where the capsule includes a body having a bottom wall, a side wall and a flange-like rim which extends from the side wall, comprises a step of applying a charge of sealing composition in a viscous state on the
(Continued)

flange-like rim and a step of compression moulding the charge of sealing composition against the flange-like rim.

9 Claims, 9 Drawing Sheets

(51) Int. Cl.
*B29C 43/08* (2006.01)
*B29C 43/18* (2006.01)
*B29C 43/34* (2006.01)
*B65B 51/02* (2006.01)
*B65B 51/10* (2006.01)
*B65D 85/804* (2006.01)
*B29L 31/00* (2006.01)

(52) U.S. Cl.
CPC .......... *B65B 7/2878* (2013.01); *B65B 29/022* (2017.08); *B65B 51/02* (2013.01); *B65B 51/10* (2013.01); *B65D 85/8043* (2013.01); *B29C 2043/3433* (2013.01); *B29L 2031/7174* (2013.01)

(58) Field of Classification Search
CPC . B29C 43/18; B29C 43/34; B29C 2043/3433; B65D 85/8043; B29L 2031/7174
USPC ...................................................... 427/207.1
See application file for complete search history.

(56) References Cited

U.S. PATENT DOCUMENTS

| | | | |
|---|---|---|---|
| 4,940,499 A | | 7/1990 | Lebrun et al. |
| 5,032,213 A * | | 7/1991 | Thomas, Jr. ............ B30B 15/34 53/341 |
| 5,082,612 A * | | 1/1992 | Butler .................. F16J 15/3232 264/138 |
| 5,183,617 A * | | 2/1993 | Saitoh ................. B29C 37/0082 264/249 |
| 5,326,244 A * | | 7/1994 | Ridgill ................ B29C 33/0044 264/259 |
| 5,376,416 A * | | 12/1994 | Nussen ................ C09K 3/1021 428/35.7 |
| 5,402,707 A * | | 4/1995 | Fond ................... A47J 31/0678 99/295 |
| 6,660,087 B2 * | | 12/2003 | Murakami ............ B29C 65/485 156/391 |
| 7,082,738 B2 | | 8/2006 | Konishi et al. |
| 8,535,743 B2 * | | 9/2013 | Kamerbeek ........... A47J 31/407 426/77 |
| 8,980,347 B2 * | | 3/2015 | Kaeser .................... F16J 15/14 426/77 |
| 9,085,105 B2 * | | 7/2015 | Haraguchi ............. B29C 44/58 |
| 9,611,089 B2 * | | 4/2017 | Kamerbeek ........... A47J 31/407 |
| 10,173,797 B2 * | | 1/2019 | Rea ............................ B65B 1/12 |
| 2004/0141886 A1 * | | 7/2004 | Py ........................ B65D 51/002 141/329 |
| 2005/0160698 A1 | | 7/2005 | Caffeo |
| 2006/0110507 A1 * | | 5/2006 | Yoakim ............... A47J 31/3628 426/433 |
| 2007/0082151 A1 * | | 4/2007 | Hatano ................... B29C 66/71 428/35.7 |
| 2007/0202237 A1 * | | 8/2007 | Yoakim .............. B65D 85/8043 426/590 |
| 2010/0015307 A1 * | | 1/2010 | Abegglen ......... B29C 45/14336 426/392 |
| 2011/0186450 A1 | | 8/2011 | Bonacci |
| 2011/0240641 A1 * | | 10/2011 | Huels ...................... B65B 7/164 53/485 |
| 2019/0127114 A1 * | | 5/2019 | Livesley-James .......................... B65D 77/2024 |

FOREIGN PATENT DOCUMENTS

| | | |
|---|---|---|
| CN | 102099177 | 6/2011 |
| CN | 106061847 | 10/2016 |
| EP | 1451010 | 8/2006 |
| EP | 1849715 B1 | 7/2009 |
| EP | 2279845 A2 | 2/2011 |
| EP | 2284100 A1 | 2/2011 |
| EP | 2151313 B1 | 10/2011 |
| EP | 2012994 B1 | 7/2012 |
| JP | H02-155711 | 6/1990 |
| JP | H05-337974 | 12/1993 |
| JP | 2000-167889 | 6/2000 |
| JP | 2009-534269 | 9/2009 |
| JP | 2012-530529 | 12/2012 |
| TW | 201442921 | 11/2014 |
| TW | 201628943 | 8/2016 |
| WO | 8404507 A1 | 11/1984 |
| WO | 2014136015 | 9/2014 |
| WO | 2015181668 | 12/2015 |
| WO | 2015181668 A1 | 12/2015 |
| WO | 2015186035 | 12/2015 |
| WO | 2016067128 | 5/2016 |

OTHER PUBLICATIONS

Notice of Reasons of Refusal dated Jul. 6, 2021 in corresponding application No. 2019-561955 in Japan.
Search Report dated May 28, 2021 in corresponding application No. 107117938 in Taiwan.
Notice of Reasons of Refusal dated Nov. 6, 2020 in corresponding application No. 2019-561955 in Japan.
Examination Report dated Dec. 23, 2020 in corresponding application No. 201927037988 in India.
Office action dated Jan. 20, 2021 in corresponding application No. 2018800348641 in China.

\* cited by examiner

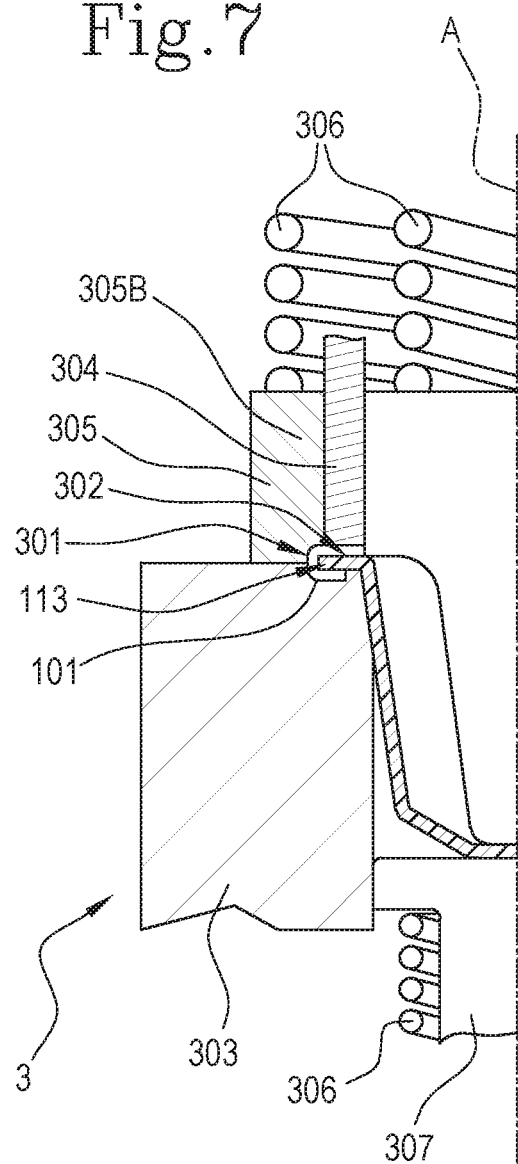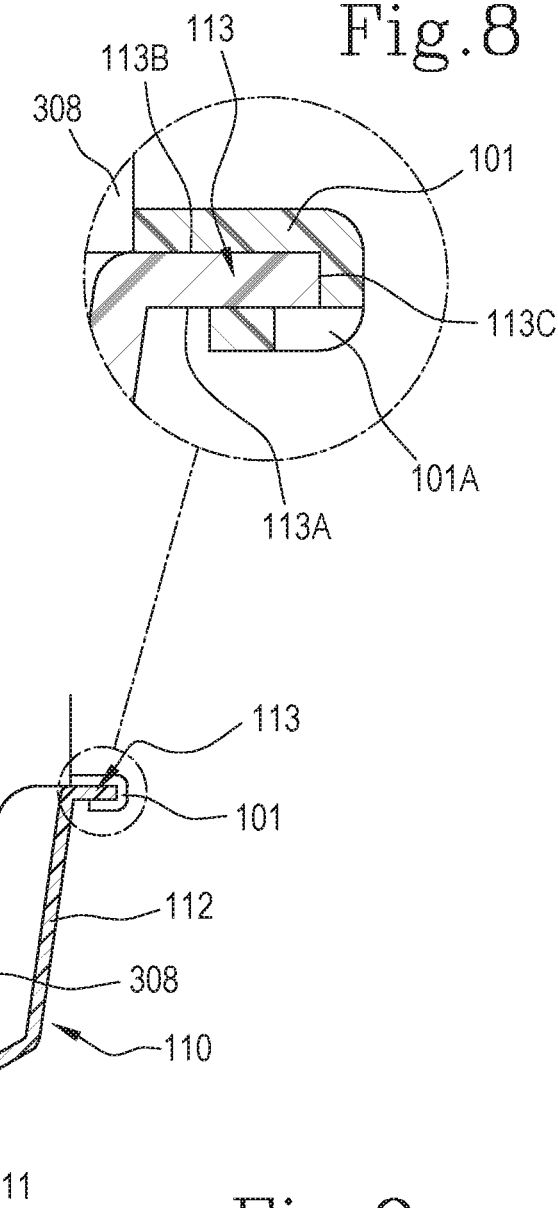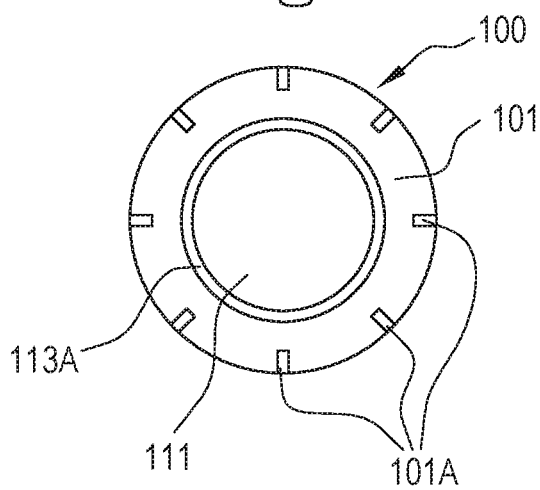

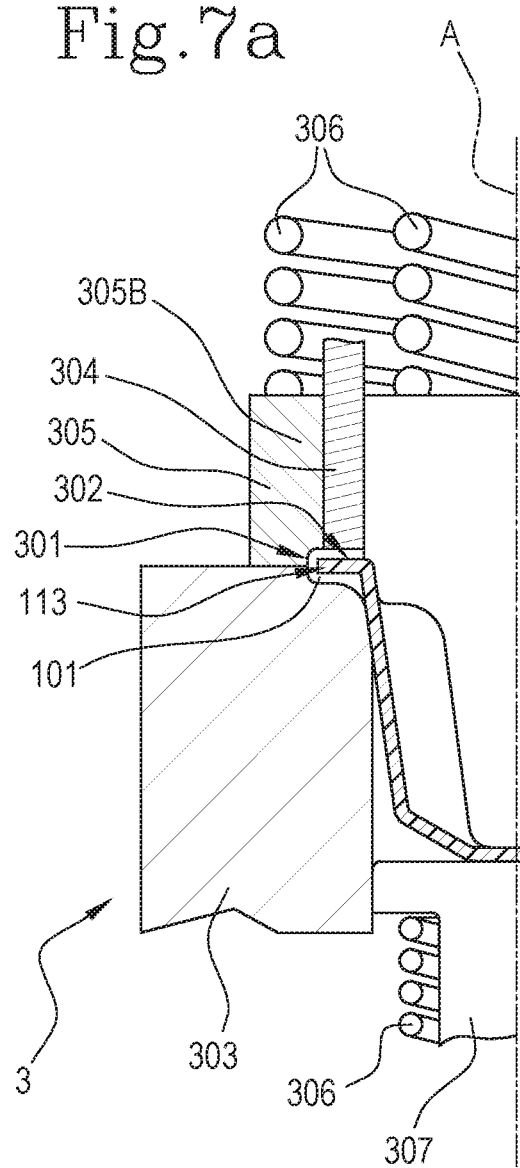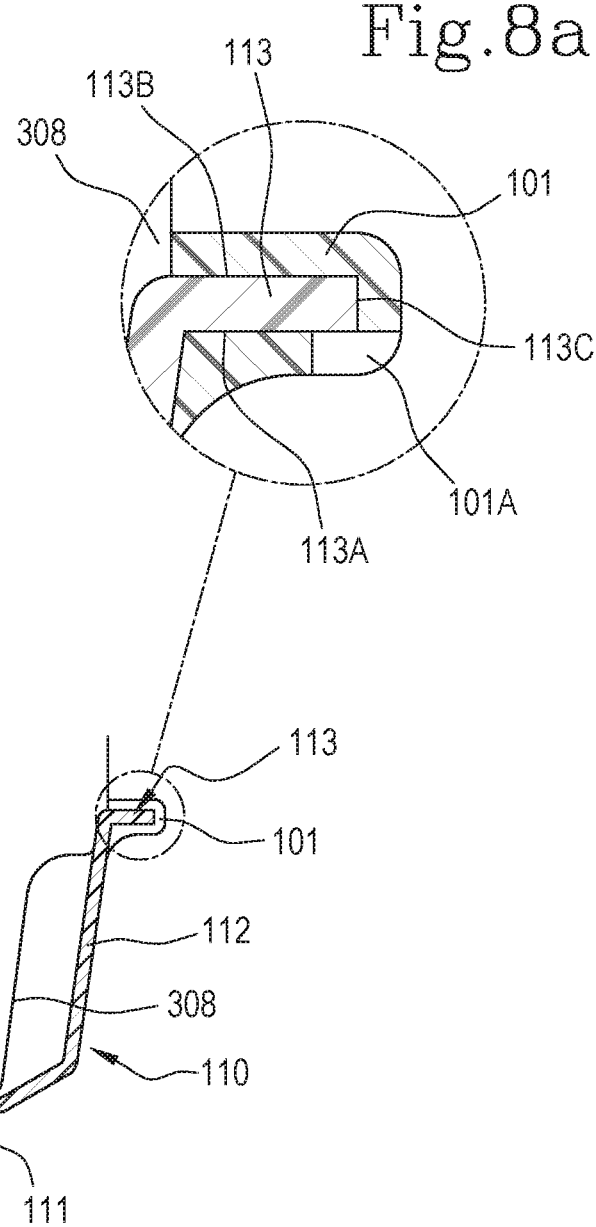

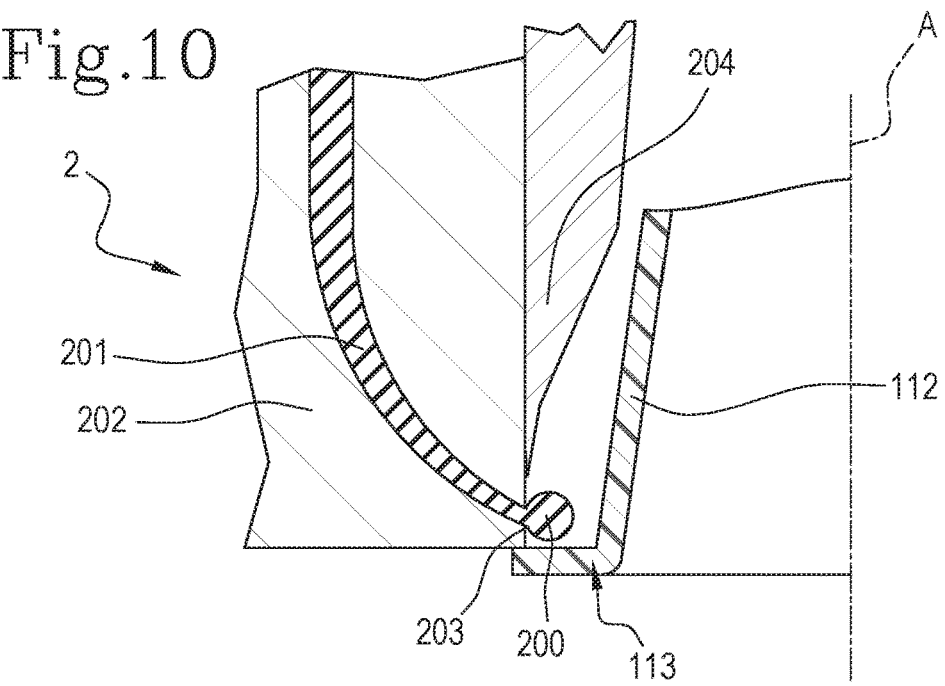
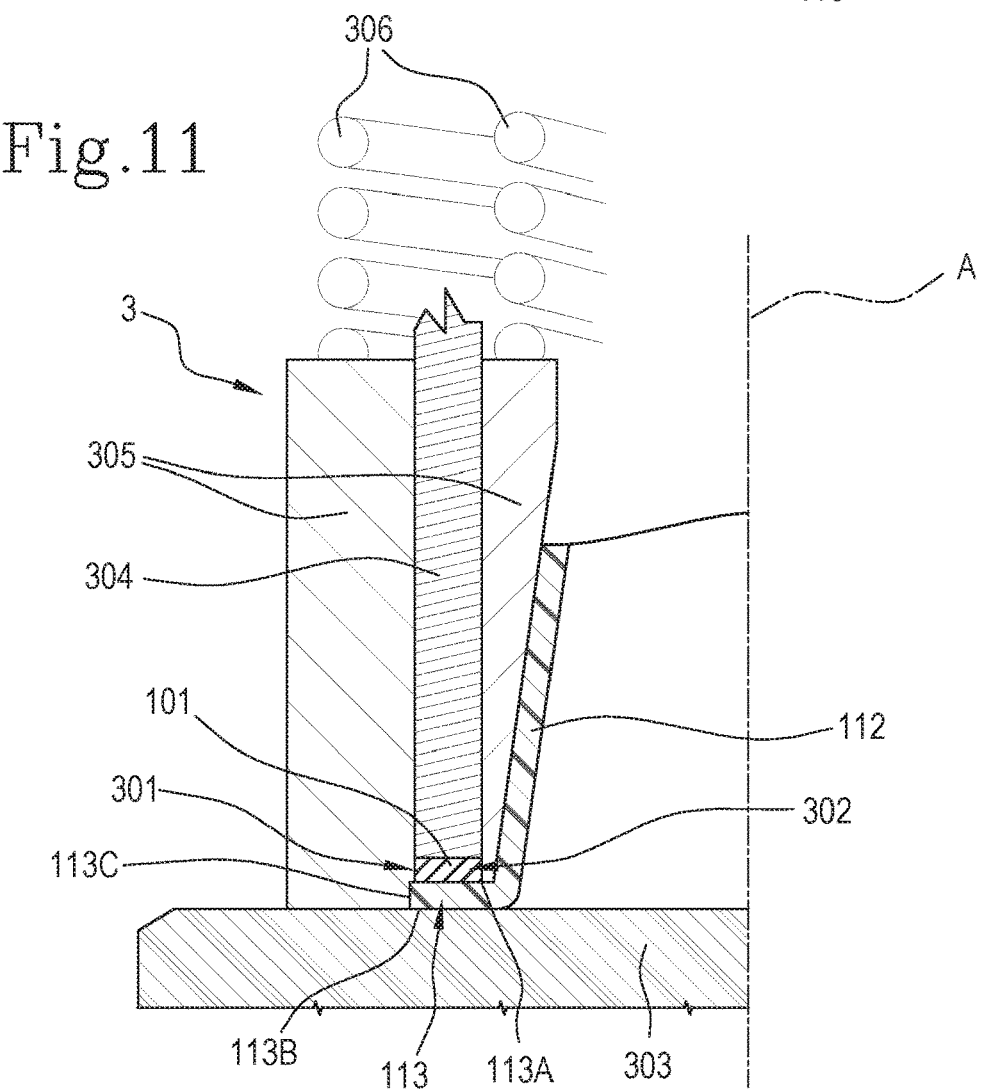

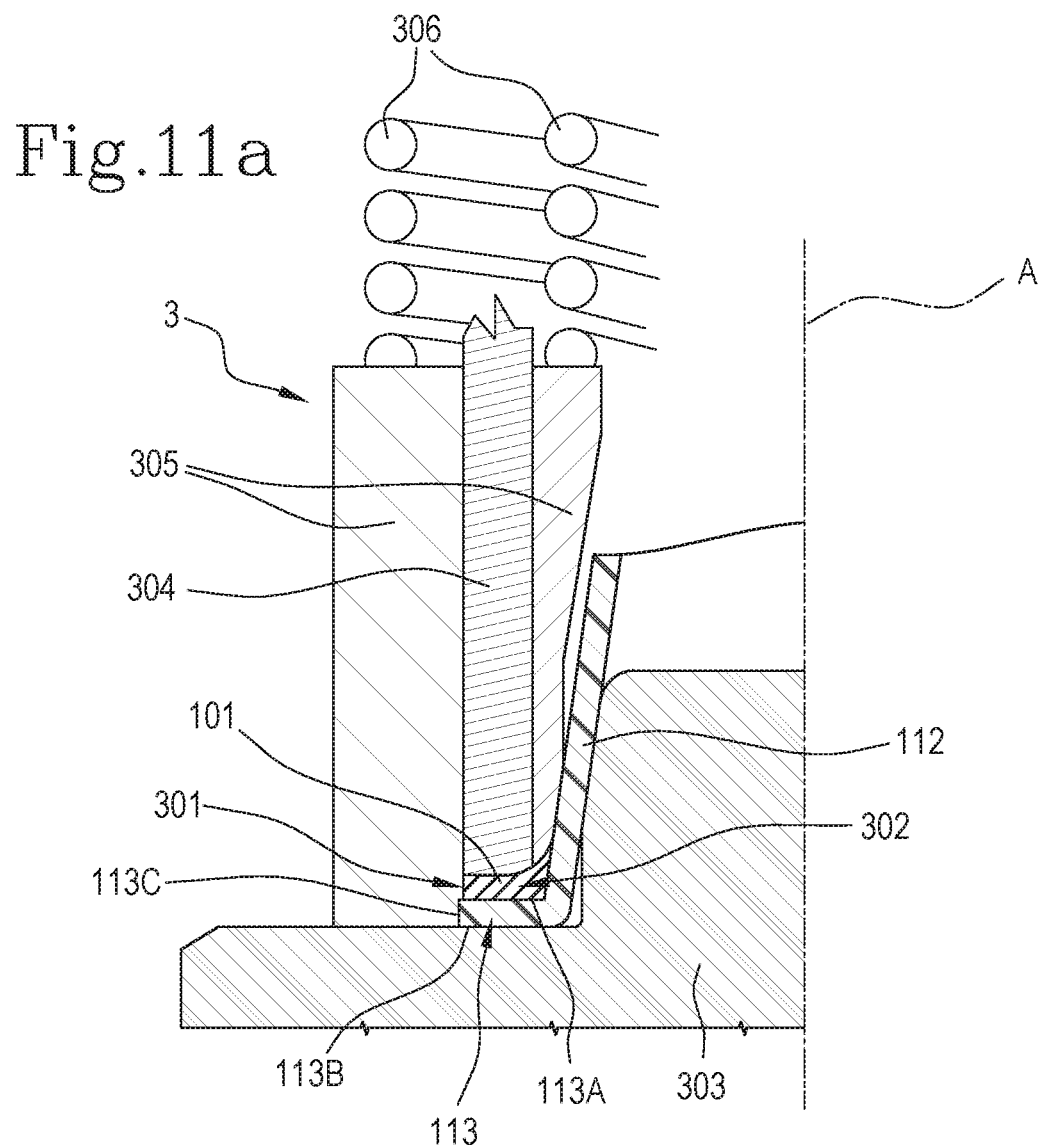

METHOD AND APPARATUS FOR APPLYING A SEALING MEMBER TO A CAPSULE FOR PREPARING A BEVERAGE

TECHNICAL FIELD

This invention relates to a method and an apparatus for applying a sealing member to a capsule for preparing a beverage.

BACKGROUND ART

Known in the sector of beverage production by infusion is the use of capsules containing infusion material such as coffee, for example. The capsules are designed to be placed in specific machines where hot water or steam is fed into the capsule in order to brew the beverage.

In these machines, the capsule must remain airtight so as to obtain a pressurized environment. In many cases, the airtight seal is created on a flange-like rim of the capsule.

In this context, patent document EP2012994B1 describes the making of a sealing member on the flange by injection moulding.

Patent document EP1849715B1 describes a solution in which a sealing ring is retained on the flange by crimping the end of the flange itself.

Patent document EP2151313B1 describes applying the seal on the flange by heating a charge of the sealing composition until it spreads over the entire surface and then conditioning the layer thus obtained.

Another method for applying a sealing member to a capsule is known from patent document EP2279845A2.

There continues, however, to be a need to improve the capsule seal and the method to make the seal.

DISCLOSURE OF THE INVENTION

The aim of this invention is to provide a method and an apparatus for applying a sealing member to a capsule for preparing a beverage to overcome the above mentioned drawbacks of the prior art.

This aim is achieved by the method and apparatus of this disclosure as characterized in one or more of the appended claims.

Generally speaking, the method according to this disclosure is a method for applying a layer to a capsule intended for the preparation of a beverage in a device for making beverages. This layer is of plastic material. In one embodiment (which this disclosure will concentrate on, without thereby losing in generality), this layer is a sealing member. In other possible embodiments, this layer might be a stiffening or reinforcing element.

In one embodiment, the capsule includes a body having a bottom wall. In one embodiment, the body comprises a side wall. In one embodiment, the radial cross section profile of the bottom wall is inclined to an axis of symmetry of the capsule. In another embodiment, the radial cross section profile of the side wall is parallel to the axis of symmetry of the capsule.

The body of the capsule comprises a flange-like rim. In one embodiment, the flange-like rim extends from the side wall. In one embodiment, the flange-like rim extends from the side wall outwards relative to the axis of symmetry of the capsule.

In one embodiment, the method comprises a step of applying a charge of sealing composition on the flange-like rim. In one embodiment, the charge is applied in a viscous state. In one embodiment, the method comprises a step of compression moulding the charge of sealing composition against the flange-like rim. In one embodiment, the method comprises a step of compression moulding the charge of sealing composition on, that is to say, in contact with, the flange-like rim.

In one embodiment of the method, where the flange-like rim has a rear face directed towards the bottom wall of the body, and a front face, opposite to the rear face, the charge of sealing composition, during the step of compression moulding, is made to adhere at least to the rear face of the flange-like rim.

In one embodiment of the method, the charge of sealing composition, during the step of compression moulding, is made to adhere to the rear face of the flange-like rim and in a zone of intersection between the rear face of the flange-like rim and the side wall of the body.

In one embodiment of the method, the charge of sealing composition, during the step of compression moulding, is made to adhere in a zone of intersection between the rear face of the flange-like rim and the side wall of the body.

In one embodiment of the method, the charge of sealing composition is applied by placing it on the front face of the flange-like rim and, during the step of compression moulding, the sealing composition making up the charge is made to migrate by compression. The term "migrate" is used to mean the tendency of the charge of viscous sealing composition to occupy the space surrounding it when subjected to compression. In a variant embodiment of the method, migration occurs around an end edge of the flange-like rim so as to adhere to both the front face and the rear face of the flange-like rim.

In one embodiment, the step of applying the charge of sealing composition includes a step of passing the sealing composition through an annular orifice.

In one embodiment, the step of passing the sealing composition through the annular orifice causes the sealing composition to be extruded through the annular orifice. In one embodiment, the step of applying the charge of sealing composition includes a step of cutting off the sealing composition fed out of the annular orifice in order to obtain the required charge. In one embodiment, the step of applying the charge of sealing composition includes a step of delivering the charge onto a surface of the flange-like rim. In one embodiment, the charge of sealing composition is delivered onto a front surface of the flange-like rim. In one embodiment, the charge of sealing composition is delivered onto a rear surface of the flange-like rim.

In one embodiment, the method comprises a step of compression moulding. The step of compression moulding, in one embodiment, comprises a step of moving one or more elements of a mould closer to the flange-like rim. In one embodiment, the mould elements are shells. This allows forming a shaping cavity which includes the charge of sealing composition and surrounds at least part of the flange-like rim. In one embodiment, the step of compression moulding comprises compressing the charge of sealing composition by means of a mobile presser. This allows forcing the sealing composition of the charge to occupy the entire shaping cavity.

In one embodiment, the method comprises a step of supporting the capsule. The step of supporting is accomplished by an abutment element which contributes to forming the shaping cavity and supports the capsule on an outer portion of the flange-like rim. In one embodiment, the step of supporting the capsule is simultaneous with the step of compression moulding.

In one embodiment of the method, the flange-like rim is in contact with the abutment element. Contact occurs on a plurality of teeth of the abutment element. In one embodiment, where the charge of sealing composition is deposited on the front face of the flange-like rim, the teeth support the flange-like rim. In one embodiment, where the charge of sealing composition is deposited on the rear face of the flange-like rim, the teeth support the flange-like rim. The teeth are angularly spaced and positioned outside an uninterrupted inner annular portion of the shaping cavity. The teeth leave grooves on the sealing member.

In one embodiment, the method comprises a step of stably joining a lid to the body. In one embodiment, the step of stably joining is accomplished by sealing the lid to a front face of the flange-like rim in an inner annular zone of the front face, surrounded by an outer zone of the front face which is covered by the sealing member.

In one embodiment, the method comprises a step of stably joining a lid to the sealing member. This allows closing the capsule body with, enclosed therein, the infusion material needed to make the beverage.

In another embodiment, the method comprises a step of stably joining the lid to the body. In one embodiment, the step of stably joining is carried out directly on a front face of the flange-like rim, where the annular sealing member is superposed on an outer edge of the lid.

This disclosure also provides an apparatus for applying a sealing member to a capsule intended for the preparation of a beverage in a device for making beverages. The capsule includes a body having a bottom wall. The body comprises a side wall. The body comprises a flange-like rim which extends from the side wall. In one embodiment, the apparatus comprises a metering device. The metering device is configured to deliver a charge of sealing composition. The metering device is configured to deliver a charge of sealing composition on the flange-like rim of the capsule. The sealing composition is, in one embodiment, in a viscous state. The sealing composition is, in one embodiment, in a liquid state.

In one embodiment, the metering device includes a nozzle configured to deliver liquid or viscous plastic. The nozzle includes an annular duct which has an inlet and an outlet and which, at the outlet, has an annular orifice. Downstream of the nozzle (more specifically, downstream of the annular orifice of the nozzle), there is a cutter. The apparatus may also include an extruder (not illustrated), located upstream of the metering device, to supply liquid plastic from plastic in the solid state (for example, pellets). The inlet of the metering device receives the liquid plastic from the extruder (not illustrated). The metering device is configured to deliver a charge of sealing composition, that is, deposit a layer of plastic, on the flange-like rim of the capsule.

In one embodiment, the apparatus comprises a compression moulding device. The compression moulding device comprises a mould. The shaping mould is configured to form a shaping cavity. The shaping cavity is geometrically shaped to at least partly surround the flange-like rim of the capsule with an uninterrupted inner annular portion of the shaping cavity. This allows compressing the charge of sealing composition against, that is, in contact with, the flange-like rim in the shaping cavity.

In one embodiment, the mould has an abutment element which contributes to forming the shaping cavity. In one embodiment, the mould includes a plurality of teeth which are angularly spaced and project into the shaping cavity from a position round the outside of the uninterrupted inner annular portion of the shaping cavity itself.

In one embodiment, the shaping cavity of the mould is shaped to surround an end edge of the flange-like rim. In one embodiment, the shaping cavity of the mould is shaped to surround at least part of the front face.

In one embodiment, the shaping cavity of the mould is shaped to surround at least part of the rear face of the flange-like rim. In one embodiment, the shaping cavity of the mould is shaped to surround a zone of intersection between the rear face of the flange-like rim and the side wall of the body.

In one embodiment, where the shaping cavity of the mould is shaped to surround at least a zone of intersection between the rear face of the flange-like rim and the side wall of the body, the plastic layer is deposited on the rear face of the flange-like rim. In one embodiment, where the shaping cavity of the mould is shaped to surround at least a zone of intersection between the rear face of the flange-like rim and the side wall of the body, the plastic layer is deposited on the front face of the flange-like rim.

In one embodiment, the apparatus comprises a conveyor. The conveyor is configured to transport a plurality of capsules along a predetermined path. In one embodiment, the compression moulding device is movable along that predetermined path. In one embodiment, this movement occurs in synchrony with the conveyor.

In one embodiment, the mould has an abutment element. In one embodiment, the abutment element contributes to forming the shaping cavity. The abutment element comprises a plurality of teeth which are angularly spaced and project into the shaping cavity from a position round the outside of the uninterrupted inner annular portion of the shaping cavity itself. In one embodiment, the apparatus comprises a plurality of moulds. In one embodiment, for each of the moulds of the plurality of moulds, the abutment element is associated with the conveyor. This allows receiving and supporting a corresponding capsule and moving as one with the conveyor.

In or more embodiments, the metering device, the conveyor, the transfer carousel and the intermediate carousel include one or more of the features described in WO2015181668A1 or in document IT0001424535, which are incorporated herein by reference.

This disclosure also provides a capsule intended for the preparation of a beverage in a device for making beverages. In one embodiment, the capsule comprises a body. The body includes a bottom wall. The body includes a side wall. The body includes a flange-like rim. The flange-like rim extends from the side wall. The flange-like rim comprises a rear face, directed towards the bottom wall of the body, and a front face opposite to the rear face.

In one embodiment, the body of the capsule is made of plastic material. In one embodiment, the body of the capsule is made of aluminium.

In one embodiment, the capsule comprises a sealing member. In one embodiment, the sealing member surrounds an end edge of the flange-like rim. In one embodiment, the sealing member surrounds at least part of the front face. In one embodiment, the sealing member surrounds at least part of the rear face of the flange-like rim. In one embodiment, the sealing member surrounds a zone of intersection between the side wall of the body and the flange-like rim.

In one embodiment, the capsule comprises a lid. In one embodiment, the lid is joined to the body on the front face of the flange-like rim in an inner annular zone of the front face, surrounded by an outer zone of the front face which is covered by the sealing member. In one embodiment, the capsule comprises an infusion material for making the beverage. The infusion material is contained in a housing formed by the body and closed by the lid.

In another embodiment, the lid is connected to the sealing member which is superposed on the front face of the flange-like rim.

In another embodiment, the lid is joined to the body directly on the front face of the flange-like rim, where the annular sealing member is superposed on an outer edge of the lid.

In one embodiment, where the body of the capsule is of aluminium, the capsule comprises an adhesive lacquer configured to keep the sealing member attached to the capsule.

BRIEF DESCRIPTION OF DRAWINGS

This and other features will become more apparent from the following description of a preferred embodiment, illustrated by way of non-limiting example in the accompanying drawings, in which:

FIG. 7 shows a cross section of the apparatus of FIG. 1 for making the capsule of FIG. 2 during a step of compression moulding a charge of sealing composition;

FIG. 7A shows a cross section of the apparatus of FIG. 1 for making the capsule of FIG. 2A during a step of compression moulding a charge of sealing composition;

FIG. 8 shows a detail in cross section of a flange-like rim of the capsule of FIG. 2 and of the sealing member, highlighting the grooves left by the teeth of an abutment element;

FIGS. 8A, 8B and 8C show details in cross section of respective embodiments of a flange-like rim of the capsule of FIG. 2A and of the sealing member, highlighting the grooves left by the teeth of an abutment element;

FIG. 9 is a bottom view of the capsule of FIG. 2;

FIG. 10 shows a detail in cross section of the apparatus of FIG. 1 for making the capsule in the embodiment of FIG. 3 during a step of applying a charge of sealing composition;

FIG. 11 shows a detail in cross section of the apparatus of FIG. 1 for making the capsule in the embodiment of FIG. 3 during a step of compression moulding a charge of sealing composition;

FIG. 11A shows a detail in cross section of the apparatus of FIG. 1 for making the capsule in the embodiment of FIG. 3A during a step of compression moulding a charge of sealing composition.

DETAILED DESCRIPTION OF PREFERRED EMBODIMENTS OF THE INVENTION

Figure 1:
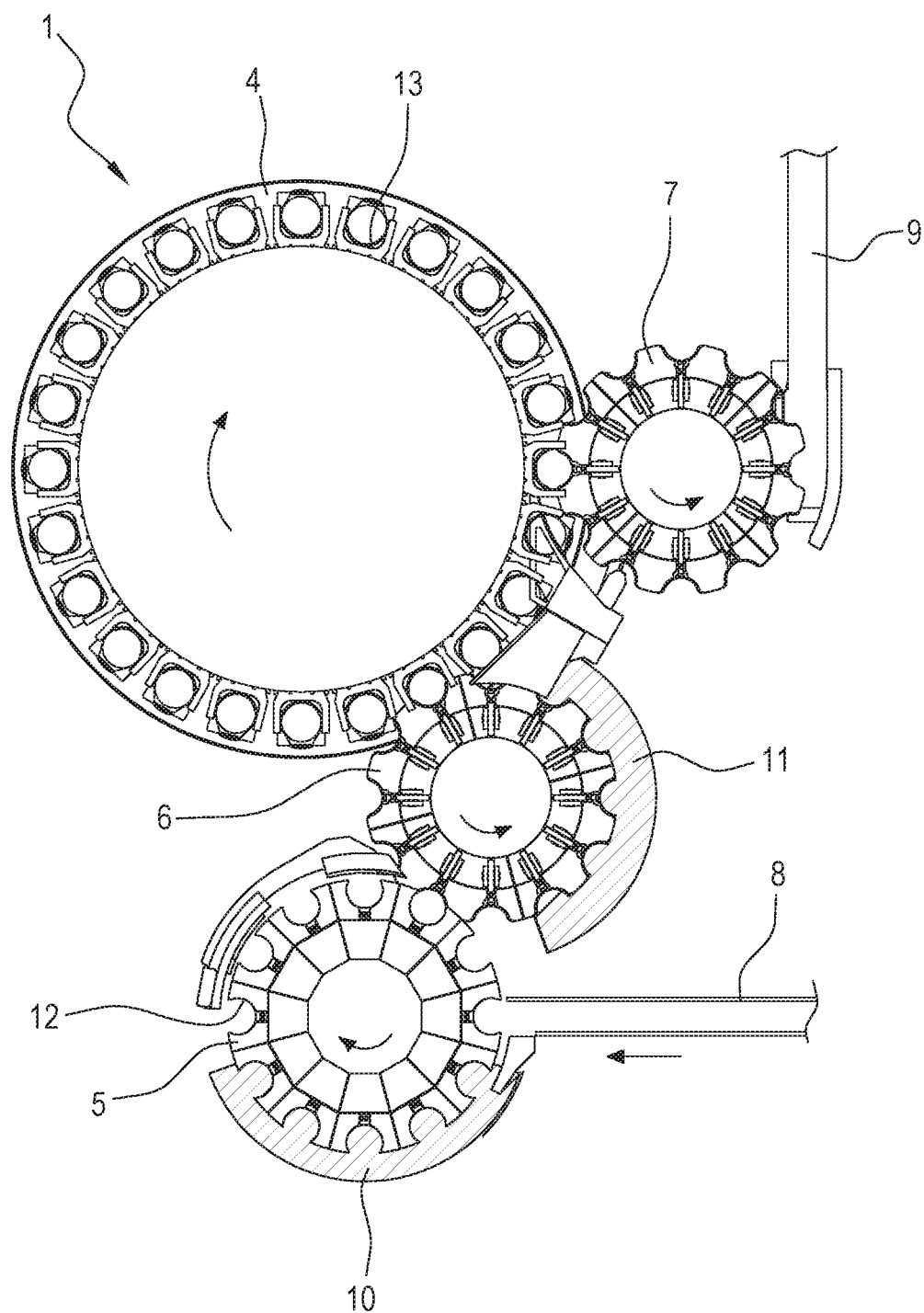
FIG. 1 illustrates an apparatus according to this disclosure.
Figure 2:
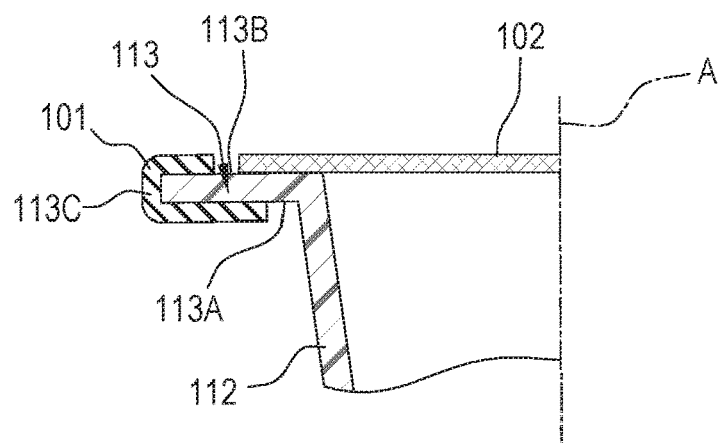
FIG. 2 shows a detail in cross section of a capsule with lid and sealing member according to this disclosure.
Figure 3:
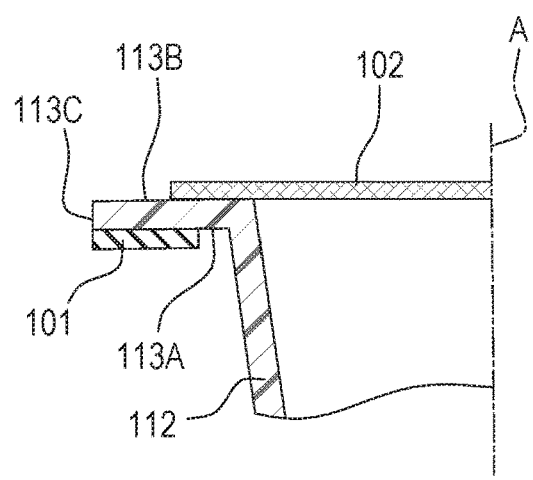
FIGS. 2A, 3, 3A, 4, 4A, 5, 5A show details in cross section of seven corresponding embodiments of the capsule of FIG. 2.
Figure 4:
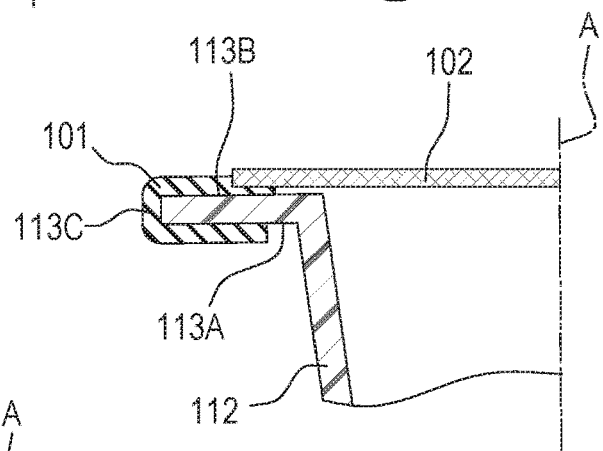
Figure 5:
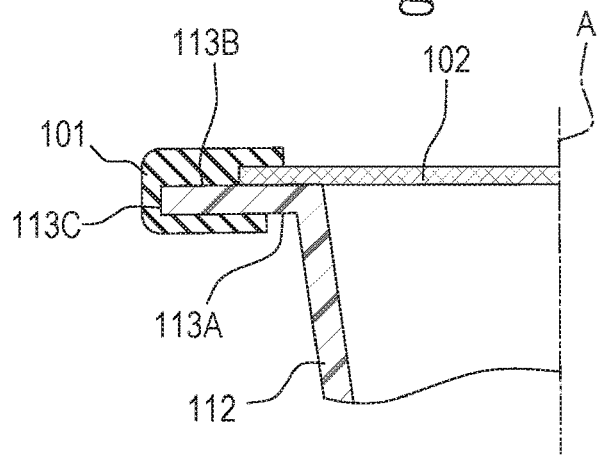
Figure 2A:
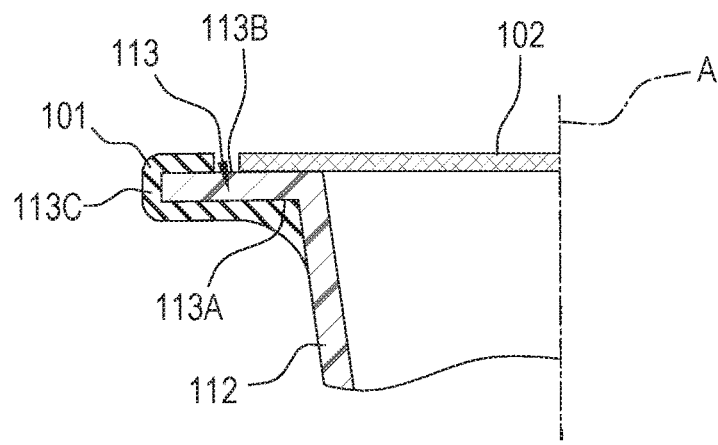
Figure 4A:
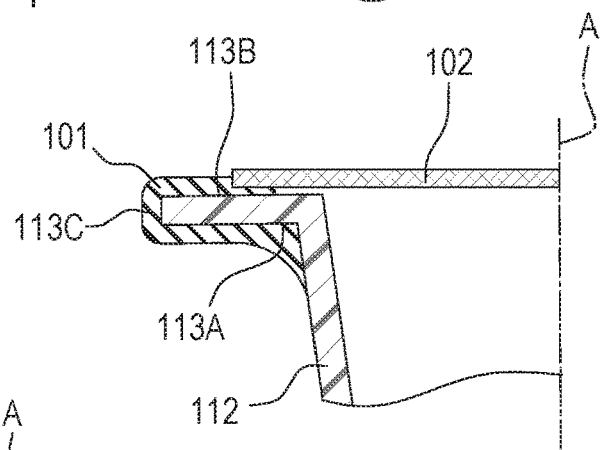
Figure 3A:
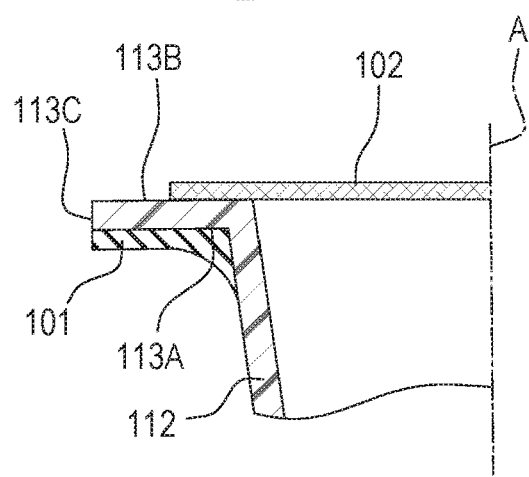
Figure 5A:
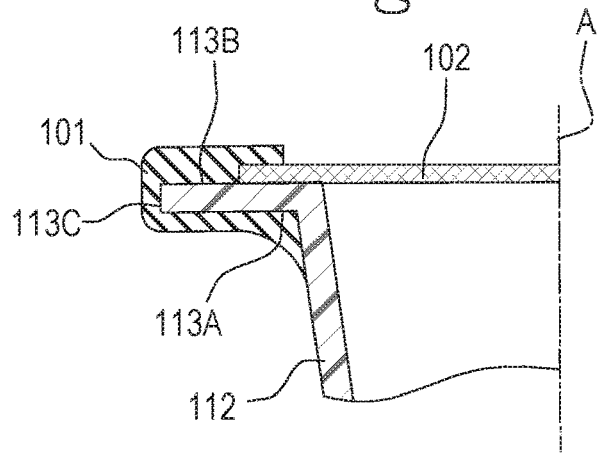
Figure 6:
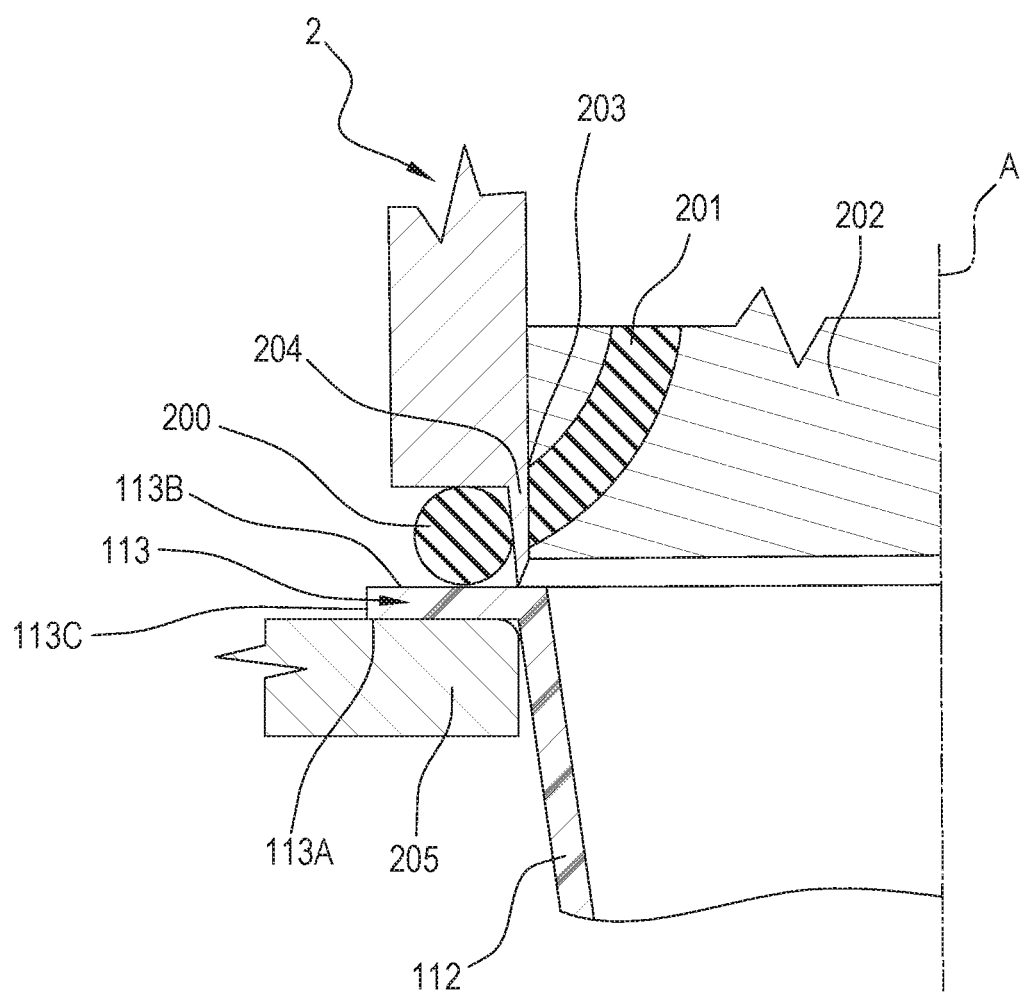
FIG. 6 shows a detail in cross section of the apparatus of FIG. 1 for making the capsule of FIG. 2 during a step of applying a charge of sealing composition.
Figure 8B:
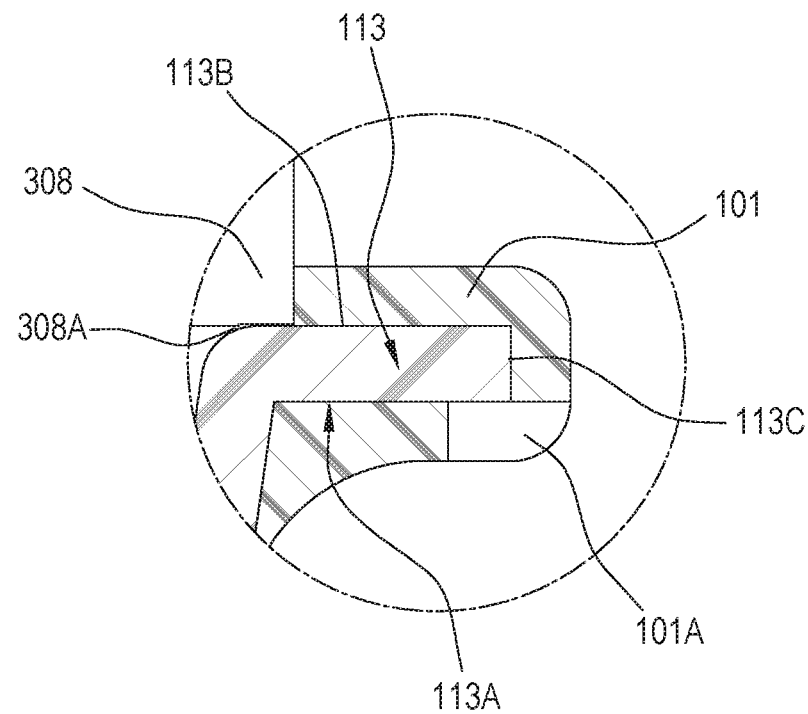
Figure 8C:
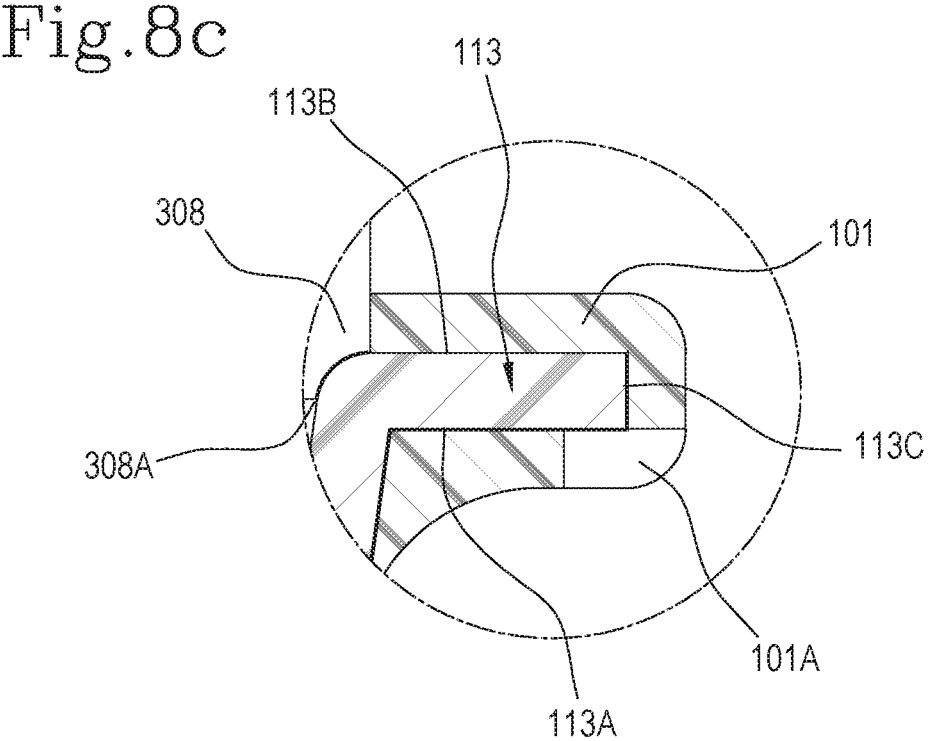

With reference to the accompanying drawings, the numeral 1 denotes an apparatus for applying a sealing member to a capsule 100 intended for the preparation of a beverage in a device for making beverages.

In one embodiment, the apparatus 1 comprises a metering device 2.

In one embodiment, the apparatus 1 includes a charging carousel 5. The charging carousel 5 includes at least one charging cavity 12 configured to receive the capsule 100 and to present it to the metering device 2.

In one embodiment, the apparatus 1 includes a compression moulding device 3. In one embodiment, the apparatus 1 includes a conveyor 4. In one embodiment, the conveyor 4 is configured to transport a plurality of capsules along a predetermined path. In one embodiment, the predetermined path is circular and the conveyor 4 is a carousel. In one embodiment, the predetermined path is rectilinear. In one embodiment, the compression moulding device 3 is movable along the predetermined path in phase synchrony with the conveyor 4.

The conveyor 4 includes at least one mould location 13 configured to receive the capsule 100 and to present it to the compression moulding device 3.

In one embodiment, the apparatus 1 includes a feed line 8 configured to feed the capsule 100 to the charging cavity 12 of the charging carousel 5.

In one embodiment, the apparatus 1 includes an expulsion line 9 configured to expel the capsule 100 from the mould location 13 of the conveyor 4.

In one embodiment, the apparatus comprises an intermediate carousel 6. The intermediate carousel 6 includes one or more intermediate housings, each configured to receive a capsule and transfer it from the charging carousel 5 to the conveyor 4.

In one embodiment, the apparatus includes a transfer carousel 7. The transfer carousel 7 includes one or more transfer housings, each configured to receive a capsule and transfer it from the conveyor 4 to the expulsion line 9.

In one embodiment, the charging carousel 5 comprises a pre-heating plate 10. In one embodiment, the pre-heating plate 10 is an induction plate. In one embodiment, the intermediate carousel 6 comprises a post-heating plate 11. In one embodiment, the post-heating plate 11 is an induction plate. In one embodiment, the conveyor 4 comprises heating means. In one embodiment, the transfer carousel 7 comprises heating means. The heating means of the conveyor 4 or of the transfer carousel 7 are, in one embodiment, induction plates. The heating means of the conveyor 4 or of the transfer carousel 7 are, in one embodiment, electrical resistors.

This disclosure also covers the capsule 100. In one embodiment, the capsule 100 includes a body 110. In one embodiment, the body 110 has a bottom wall 111. In one embodiment, the body 110 has a side wall 112. In one embodiment, the body 110 includes a flange-like rim 113. The flange-like rim 113 comprises a rear face 113A, directed towards the bottom wall 111, and a front face 113B, opposite to the rear face 113A. The flange-like rim 113 has an end edge 113C.

In one embodiment, the radial cross section profile of the bottom wall 111 is inclined to an axis of symmetry A of the capsule 100.

In one embodiment, the capsule 100 includes a sealing member 101.

The metering device 2 is configured to deliver a charge 200 of sealing composition 201, in a viscous state, onto the flange-like rim 113 of the capsule. In one embodiment, the metering device 2 is configured to deliver a charge 200 of sealing composition 201, in a viscous state, onto the rear face 113A of the flange-like rim 113. In another embodiment, the metering device 2 is configured to deliver a charge 200 of sealing composition 201, in a viscous state, onto the front face 113B of the flange-like rim 113.

In one embodiment, the sealing composition 201 comprises a polyester. In one embodiment, the sealing composition 201 comprises a resin. In one embodiment, the sealing composition 201 comprises a polyethylene.

In one embodiment, the sealing composition 201 comprises a thermoplastic elastomer. In one embodiment, the sealing composition 201 comprises a rubber. In one embodiment, the sealing composition 201 comprises a vulcanized thermoplastic material.

In one embodiment, the flange-like rim 113 is surface treated to improve adhesion of the sealing composition 201 to the flange-like rim 113 itself.

In one embodiment, the metering device 2 includes a nozzle 202 configured to deliver liquid or viscous plastic. The nozzle 202 includes an annular duct which has an inlet and an outlet and which, at the outlet, has an annular orifice 203. Downstream of the nozzle 202 (more specifically, downstream of the annular orifice 203 of the nozzle 202), there is a cutter 204. The metering device 2 may also include an extruder (not illustrated), located upstream of the metering device 2, to supply liquid plastic from plastic in the solid state (for example, pellets). The inlet of the metering device 2 receives the liquid plastic from the extruder (not illustrated).

In one embodiment, the annular orifice 203 faces the front face 1138 of the flange-like rim 113 of the capsule 100. In one embodiment, the annular orifice 203 faces the rear face 113A of the flange-like rim 113 of the capsule 100. In one embodiment, the metering device 2 is equipped with a cutter 204. The cutter 204 is, in one embodiment, positioned downstream of the annular orifice 203 and cuts the sealing composition 201 feeding out of the annular orifice 203 to obtain the charge 200. In one embodiment, the metering device 2 includes an anvil element 205 of the cutter 204. In one embodiment, the cutter 204 is configured to come into abutment against the front face 113B of the flange 113. In one embodiment, the cutter 204 is configured to come into abutment against the rear face 113A of the flange 113. The anvil element 205 is positioned in contact with the face of the flange-like rim 113 opposite the face against which the cutter 204 comes into abutment.

In one embodiment, the compression moulding device 3 is provided with a mould 301. The mould 301 forms a shaping cavity 302.

The shaping cavity 302 is geometrically shaped to at least partly surround the flange-like rim 113 of the capsule 100 with an uninterrupted inner annular portion of the shaping cavity 302. The shaping cavity 302 is geometrically shaped to compress the charge 200 of sealing composition 201 against the flange-like rim 113 in the shaping cavity 302. In one embodiment, the shaping cavity extends all around the flange 113, in contact with the front face 1138, with the end edge 113C and with the rear face 113A. In one embodiment, the shaping cavity is shaped to surround, that is, it extends in contact with, the rear face 113A.

In one embodiment, the shaping cavity 302 of the mould 301 is shaped to surround a zone of intersection between the rear face 113A of the flange-like rim 113 and the side wall 112 of the body 110.

In one embodiment, the mould 301 has an abutment element 303. The abutment element 303 is, in one embodiment, associated with the mould location 13. In one embodiment, in which the shaping cavity 302 extends all around the flange 113, in contact with the front face 1138, with the end edge 113C and with the rear face 113A, the abutment element 303 contributes to forming the shaping cavity 302. In this embodiment, the abutment element 303 is in contact with a part the rear face 113A of the flange-like rim 113. In one embodiment, the abutment element 303 includes a plurality of teeth which are angularly spaced and project into the shaping cavity from a position round the outside of the uninterrupted inner annular portion of the shaping cavity itself. The teeth form an abutment surface whereby the rear face 113A of the flange-like rim 113 rests on the abutment element 303.

In one embodiment, where the shaping cavity extends in contact with the rear face 113A, the abutment element 303 is in contact with the front face 1138 and acts as a support and abutment for the presser 304.

In one embodiment, the compression moulding device 3 comprises a plurality of moulds. For each mould 301 of the plurality of moulds, the abutment element 303 is associated with the conveyor 4 to receive and support a corresponding capsule 100 and move as one with the conveyor 4.

Downstream of the compression moulding device 3, the charge 200 becomes the sealing member 101. Downstream of the compression moulding device 3 the apparatus 1, in one embodiment, comprises a cooling element. In one embodiment, the cooling element is a fan configured to blow a jet of cool air on the sealing member 101. In one embodiment, the cooling element is a cold plate placed in contact with the sealing member 101.

In one embodiment, the shaping cavity 302 is shaped to surround an end edge 113C of the flange-like rim 113. In one embodiment, the shaping cavity 302 is shaped to surround a front face 1138 of the flange-like rim 113. In one embodiment, the shaping cavity 302 is shaped to surround a rear face 113A of the flange-like rim 113.

In one embodiment, the sealing member 101 surrounds the end edge 113C of the flange-like rim 113, at least part of the front face 1138 and at least part of the rear face 113A of the flange-like rim 113.

In one embodiment, the sealing member 101 surrounds at least part of the rear face 113A of the flange-like rim 113.

In one embodiment, the sealing member 101 surrounds at least part of the front face 1138 of the flange-like rim 113.

In one embodiment, the capsule 100 includes a lid 102.

In one embodiment, the sealing member 101 surrounds the end edge 113C of the flange-like rim 113, at least part of the front face 1138, at least part of the rear face 113A of the flange-like rim 113 and at least part of the lid 102.

In one embodiment, the lid 102 is joined to the body 112 of the capsule 100 on the front face 113B of the flange-like rim 113 in an inner annular zone of the front face 1138, surrounded by an outer zone of the front face 1138 which is covered by the sealing member 101.

In another embodiment, the lid 102 is connected to the sealing member 101 which is superposed on the front face 1138 of the flange-like rim 113.

In another embodiment, the lid 102 is joined to the body 112 of the capsule 100 on the front face 113B of the flange-like rim 113, while the sealing member 101 covers only the rear face 113A.

In another embodiment, the lid 102 is joined to the body 112 of the capsule 100 directly on the front face 113B of the flange-like rim 113, where the sealing member is superposed on an outer edge of the lid 102.

In one embodiment, the capsule 100 comprises infusion material used to make the beverage and contained in a housing formed by the body 112 and closed by the lid 102. In one embodiment, the infusion material is coffee powder.

In one embodiment, a portion of the sealing member 101 adhering to the rear face 113A has a plurality of grooves 101A which are angularly spaced and positioned outside an uninterrupted inner annular portion of the sealing member 101. These grooves 101A correspond to the teeth of the abutment element 303.

In one embodiment, the compression moulding device 3 comprises a supporting element 307 on which the outer face of the bottom wall 111 of the capsule rests and which is thus configured to support the capsule 110.

In one embodiment, the compression moulding device 3 comprises a centring element 308 positioned at least partly in the space inside the body 110 of the capsule 100 in order to keep the capsule 110 centred in the mould location 13.

In one embodiment, the centring element 308 is configured to come into contact with the front face 113A of the capsule 100. In one embodiment, the centring element 308 is configured to come into contact with a radius connecting the inside of the flange-like rim 113 with the body 110 of the capsule 100. In these embodiments, the centring element 308 contributes to forming the shaping cavity 302.

In one embodiment, the centring element 308 comprises a vent 308A. The vent 308A is an opening between the centring element 308 and the capsule 100 to place the shaping cavity 302 in communication with the outside atmosphere. In this embodiment, contact between the centring element 308A and the capsule 100 is not hermetic. In one embodiment, the vent 308A, being very reduced in depth (in the order of a few hundredths of a millimeter) allows expelling any air that may be trapped in the shaping cavity 302 but does not allow the sealing composition 201 to escape.

In one embodiment, the one or more shells 305, the abutment element 303, the supporting element 307 and the centring element 308 are connected to springs 306, configured to close the shells 305 and the abutment element 303 around the shaping cavity 302 to keep the capsule 110 in the mould location 13.

This disclosure also provides a method for applying a sealing member 101 to a capsule 100 intended for the preparation of a beverage in a device for making beverages, where the capsule 100 includes a body 110 having a bottom wall 111, a side wall 112 and a flange-like rim 113 which extends from the side wall 112.

In one embodiment, the method comprises a step of feeding the capsule 100 on a feed line 8 to a charging cavity 12 on a charging carousel 5. The charging carousel 5 presents the capsule to a metering device 2.

In one embodiment, the method comprises a step of applying a charge 200 of sealing composition 201 in a viscous state on the flange-like rim 113 by means of the metering device 2. In one embodiment, the step of applying the charge 200 includes a step of passing the sealing composition 201 through an annular orifice 203.

In one embodiment, the step of passing the sealing composition 201 through the annular orifice 203 causes the sealing composition 201 to be extruded through the annular orifice 203. In one embodiment, the step of applying includes a step of cutting off the sealing composition 201 fed out of the annular orifice 203 in order to obtain the required charge 200. In one embodiment, the step of applying includes a step of delivering the charge 200 onto a surface of the flange-like rim.

In one embodiment, the charge 200 is applied by placing the charge 200 itself on the front face 113B of the flange-like rim 113. In one embodiment, the charge 200 is applied by placing the charge 200 itself on the rear face 113A of the flange-like rim 113.

In one embodiment, the step of applying the charge 200 comprises pre-heating the capsule 100 by means of a pre-heating plate 10 in order to facilitate adhesion of the charge to the flange-like rim 113. In one embodiment, the step of applying the charge 200 comprises applying an additive to the flange-like rim 113 in order to facilitate adhesion of the charge to the flange-like rim 113.

In one embodiment, the method comprises a step of transferring the capsule 100 from the charging cavity 12 to an intermediate carousel 6. In one embodiment, the method comprises a step of transferring the capsule 100 from the intermediate carousel 6 to a mould location 13 on a conveyor 4. The conveyor 4 presents the capsule 100 to a compression moulding device 3.

In one embodiment of the method, the step of applying the charge 200 is followed by a step of post-heating the capsule 100 by means of a post-heating plate 11 in order to keep the charge 200 in a viscous state. In one embodiment, post-heating is carried out after the step of applying the charge 200, before the step of transferring the capsule 100 to the mould location 13.

In one embodiment, the method comprises a step of compression moulding the charge 200 of sealing composition 201 against the flange-like rim 113 by means of the compression moulding device 3.

In one embodiment, where the flange-like rim 113 has a rear face 113A, directed towards the bottom wall 111 of the body 110, and a front face 113B, opposite to the rear face 113A, the charge 200, during the step of compression moulding, is made to adhere to the rear face 113A of the flange-like rim 113.

In one embodiment of the method, the charge 200, during the step of compression moulding, is made to adhere to the rear face 113A of the flange-like rim 113 and in a zone of intersection between the rear face 113A of the flange-like rim 113 and the side wall 112 of the body 110.

In one embodiment of the method, the charge 200, during the step of compression moulding, is made to adhere in a zone of intersection between the rear face 113A of the flange-like rim 113 and the side wall 112 of the body 110.

During the step of compression moulding, in one embodiment of the method, the sealing composition 201 making up the charge 200 is made to migrate around an end edge 113C of the flange-like rim 113 so as to adhere to both the front face 113B and the rear face 113A of the flange-like rim 113.

In one embodiment, the compression moulding step includes moving one or more shells 305 of a mould 301 close to the flange-like rim 113 to form a shaping cavity 302 which includes the charge 200 and surrounds at least part of the flange-like rim 113. In one embodiment, moving the one or more shells 305 closer to the flange-like rim 113 is accomplished by springs 306. In one embodiment, the step of compression moulding comprises compressing the charge 200 by means of a movable presser 304 to force the sealing composition 201 of the charge 200 to occupy the entire shaping cavity 302.

In one embodiment, the method comprises a step of supporting the capsule 100. The step of supporting the capsule 100 is accomplished by an abutment element 303 which contributes to forming the shaping cavity 302 and supports the capsule 100 on an outer portion of the flange-like rim 113.

In a variant of the method, the flange-like rim 113 is in contact with the abutment element 303 by a plurality of teeth of the abutment element 303.

In one embodiment, the plurality of teeth of the abutment element 303 are angularly spaced and positioned outside an uninterrupted inner annular portion of the shaping cavity 302. In one embodiment, the plurality of teeth of the abutment element 303 create a plurality of grooves 101A in the part of the sealing member which is in contact with the rear face 113A of the flange-like rim.

In one embodiment, the method comprises a step of centring the capsule 100 on the mould location 13. In one embodiment, the step of centring is carried out by a centring element 308 connected to springs 306.

In one embodiment, the method comprises a step of transferring the capsule 100 from the mould location 13 on the conveyor 4 to a transfer carousel 7. In one embodiment, the method comprises a step of expelling the capsule from the transfer carousel 7 by means of an expulsion line 9.

In one embodiment, the method comprises a step of placing infusion material, used to make the beverage, in a housing formed by the body 110 of the capsule 100.

In one embodiment, the method comprises a step of stably joining a lid 102 to the body 110. In one embodiment, the step of stably joining is accomplished by sealing the lid 102 to a front face 113B of the flange-like rim 113 in an inner annular zone of the front face 113B, surrounded by an outer zone of the front face 113B which is covered by the sealing member 101.

In another embodiment, the step of stably joining is carried out directly on a front face 113B of the flange-like rim 113, where the sealing member 101 is superposed on an outer edge of the lid 102.

In one embodiment, the method comprises a step of stably joining the lid 102 to the sealing member 101.

In one embodiment, the method comprises a step of cooling the sealing member 101. Cooling has the effect of bringing the sealing member 101 from a partly viscous state to a solid state.

The invention claimed is:

1. A method for applying a sealing member to a capsule intended for preparation of a beverage in a device for making beverages, wherein the capsule includes a body having a bottom wall, a side wall and a flange-like rim which extends from the side wall, the method comprising:
    applying a charge of a sealing composition in a viscous state on the flange-like rim, and
    compression moulding the charge of the sealing composition against the flange-like rim,
    wherein the flange-like rim has a rear face, directed towards the bottom wall of the body, and a front face, opposite to the rear face, and wherein the charge is applied by placing the charge itself on the front face of the flange-like rim and wherein, during the compression moulding, the sealing composition making up the charge is made to migrate around an end edge of the flange-like rim so as to adhere to both the front face and the rear face of the flange-like rim.

2. The method according to claim 1, wherein the charge, during the compression moulding, is made to adhere at least to the rear face of the flange-like rim and/or in a zone of intersection between the rear face of the flange-like rim and the side wall of the body.

3. The method according to claim 1, wherein applying the charge comprises:
    passing the sealing composition through an annular orifice;
    cutting off the sealing composition fed out of the annular orifice in order to obtain the charge, and
    delivering the charge onto a surface of the flange-like rim.

4. The method according to claim 1, wherein compression moulding the charge comprises:
    moving one or more elements of a mould close to the flange-like rim to form a shaping cavity which includes the charge and surrounds at least part of the flange-like rim, and
    compressing the charge by means of a movable presser to force the sealing composition of the charge to occupy the entire shaping cavity.

5. The method according to claim 4, comprising:
    supporting the capsule with an abutment element which contributes to forming the shaping cavity and supports the capsule on an outer portion of the flange-like rim.

6. The method according to claim 5, wherein the flange-like rim is in contact with the abutment element by a plurality of teeth of the abutment element which are angularly spaced and positioned outside an uninterrupted inner annular portion of the shaping cavity.

7. The method according to claim 1, comprising:
    stably joining a lid to the body by sealing the lid to a front face of the flange-like rim in an inner annular zone of the front face, surrounded by an outer zone of the front face which is covered by the sealing member.

8. The method according to claim 1, comprising:
    stably joining a lid to the sealing member to close the capsule body with, enclosed therein, the infusion material needed to make the beverage.

9. The method according to claim 1, comprising:
    stably joining the lid to the body directly on a front face of the flange-like rim, wherein the sealing member is superposed on an outer edge of the lid.

* * * * *